US012172201B2

(12) United States Patent
Mantel et al.

(10) Patent No.: US 12,172,201 B2
(45) Date of Patent: Dec. 24, 2024

(54) CLEANING DEVICE AND METHOD FOR ASSEMBLING A CLEANING DEVICE

(71) Applicant: GEA TUCHENHAGEN GMBH, Buchen (DE)

(72) Inventors: Hendrik Mantel, Buchen (DE); Christopher Lawton, Buchen (DE)

(73) Assignee: GEA Tuchenhagen GmbH (DE)

( * ) Notice: Subject to any disclaimer, the term of this patent is extended or adjusted under 35 U.S.C. 154(b) by 539 days.

(21) Appl. No.: 17/614,618

(22) PCT Filed: Apr. 1, 2020

(86) PCT No.: PCT/EP2020/059266

§ 371 (c)(1),
(2) Date: Nov. 29, 2021

(87) PCT Pub. No.: WO2020/239296

PCT Pub. Date: Dec. 3, 2020

(65) Prior Publication Data

US 2022/0226869 A1 Jul. 21, 2022

(30) Foreign Application Priority Data

May 29, 2019 (DE) ......................... 102019114558.9

(51) Int. Cl.
*B08B 9/093* (2006.01)

(52) U.S. Cl.
CPC ........ *B08B 9/0936* (2013.01); *B08B 2209/08* (2013.01)

(58) Field of Classification Search
None
See application file for complete search history.

(56) References Cited

U.S. PATENT DOCUMENTS 4,030,513 A * 6/1977 McKenzie ................ B05B 3/06 134/179
5,316,218 A * 5/1994 Bowen ................ B05B 13/0636 239/246

(Continued)

FOREIGN PATENT DOCUMENTS

CH 654760 3/1986
CN 102861684 1/2013

(Continued)

OTHER PUBLICATIONS

Machine generated English language translation of Chinese Office Action dated Jul. 26, 2023 issued in Chinese Application No. 2020800394929 (11 pages).

(Continued)

*Primary Examiner* — Cristi J Tate-Sims
(74) *Attorney, Agent, or Firm* — Merek, Blackmon & Voorhees, LLC

(57) ABSTRACT

The invention relates to a cleaning device (100) for cleaning a container, in particular an inner wall of a container, comprising:

Figure 1:
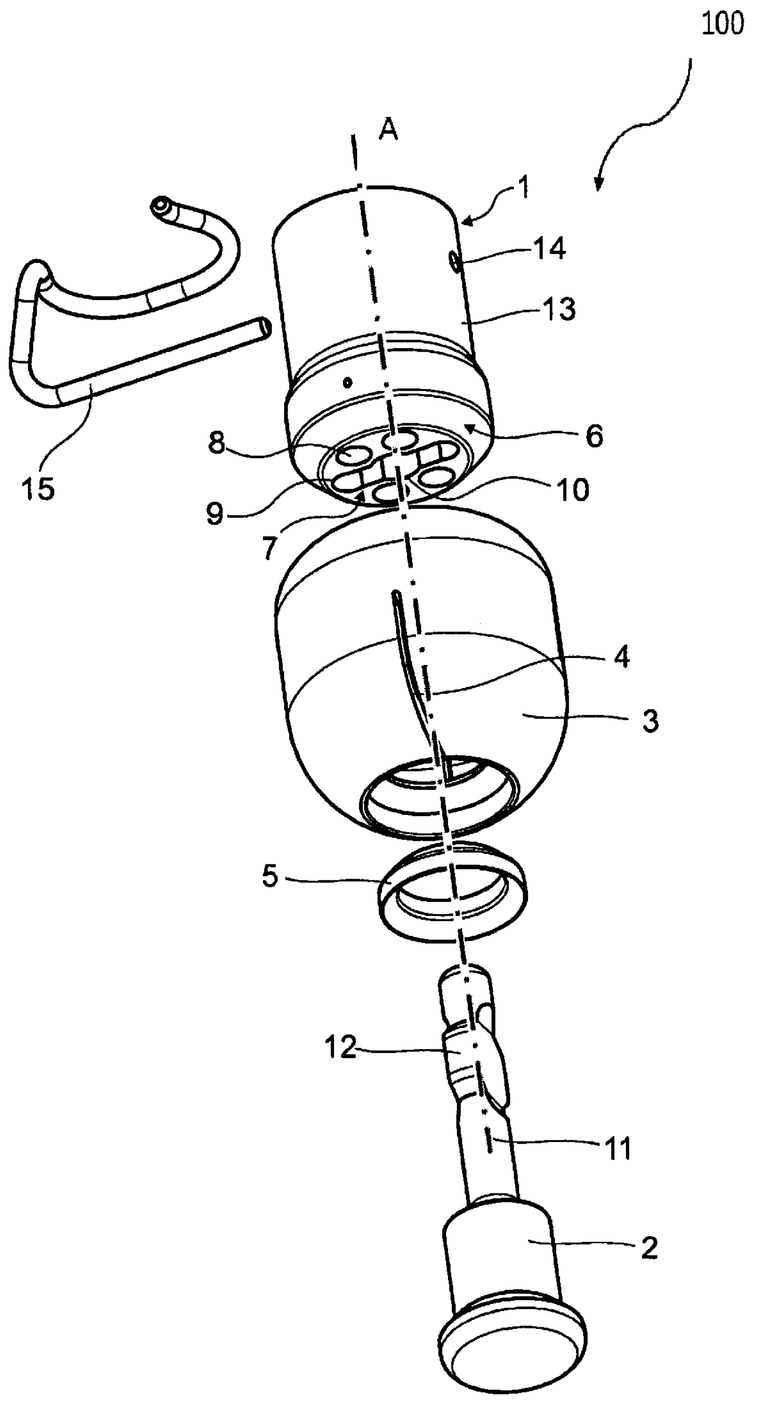

a base member (1) that can be coupled to a feed pipe for supplying a cleaning agent, a rotating member (3) mounted rotatably about a rotational axis (A) on the base member (1), a support member (2) having a first end portion (16) and a second end portion spaced apart along the rotational axis (A), wherein the first end portion (16) can be coupled to the base member (1) and the second end portion to the rotating member (3) in such a way that in the coupled state the rotating member (3) is rotatably accommodated between the base member (1) and the support member (2), wherein the cleaning device (100) further comprises a coupling means (15) which is adapted to lock the support member (2) in place relative to the base member (1) in the coupled state. The invention also relates to a method for assembling a cleaning device (100).

20 Claims, 4 Drawing Sheets

(56) References Cited

U.S. PATENT DOCUMENTS

| | | | |
|---|---|---|---|
| 8,137,481 | B2 | 3/2012 | Jensen et al. |
| 2009/0114741 | A1 | 5/2009 | Robert et al. |
| 2010/0326482 | A1 | 12/2010 | Jensen et al. |

FOREIGN PATENT DOCUMENTS

| | | |
|---|---|---|
| CN | 203995511 | 12/2014 |
| FR | 2500334 | 8/1982 |
| JP | 2002370051 | 12/2002 |

OTHER PUBLICATIONS

Chinese Office Action dated Jul. 26, 2023 issued in Chinese Application No. 2020800394929 (10 pages).
Machine generated translation of CN203995511.
Machine generated English language translation of Chinese Search Report dated Oct. 12, 2022 issued in Chinese Application No. 2020800394929 (2 pages).
Machine generated English language translation of Chinese Office Action dated Oct. 19, 2022 issued in Chinese Application No. 2020800394929 (3 pages).
Machine generated translation of CH654760.
Machine generated translation of JP2002370051.
International Search Report issued in International Application No. PCT/EP2020/059266, 2 pages.
Written Opinion of the International Searching Authority issued in International Application No. PCT/EP2020/059266, 5 pages.
English translation of pp. 4 and 5 of Written Opinion of the International Searching Authority issued in International Application No. PCT/EP2020/059266, 2 pages.
Examination Report dated Dec. 14, 2022 issued in European Application No. 20717593.6, four (4) pages.
Machine translation of Examination Report dated Dec. 14, 2022 issued in European Application No. 20717593.6, four (4) pages.

* cited by examiner

CLEANING DEVICE AND METHOD FOR ASSEMBLING A CLEANING DEVICE

The invention relates to a cleaning device for cleaning a container, in particular an inner wall of a container, and to a method for assembling a cleaning device.

U.S. Pat. No. 8,137,481 B2 shows a generic cleaning device. Said document presents a cleaner which is connectable to the end of a feed pipe, which can be inserted into a container, for example through an opening in the upper region of the container. A cleaning agent is supplied to the cleaner through the feed pipe. The cleaning device has openings through which said cleaning agent is discharged and subsequently wets the inner wall of the container. The openings are provided on a rotatable part of the cleaning device so that wetting is over as large an area and as comprehensive as possible. The shape of the openings and the rotation of the rotatable part produce a spray pattern on the inner wall of the container. In addition to dense wetting, the aim is to produce a mechanical effect that results in thorough cleaning.

The cleaning device according to U.S. Pat. No. 8,137,481 B2 meets the requirements of the 3A standard. The latter specifies a sanitary design which, according to 3A, requires that the cleaning device can be disassembled and cleaned and that there are no spaces, for example screw connections in threaded blind holes, which cannot be accessed and therefore cannot be cleaned.

The cleaning device according to U.S. Pat. No. 8,137,481 ensures compliance with these requirements by means of the following construction: The rotor part 4 of the cleaning device rests on a surface 9 of a base portion 7. The latter has a rod 8 with a through hole 12. Rod 8 is accommodated in a stator part 2, the wall of which has holes 17 on opposite sides. The device is assembled by inserting the rod into part 2 until holes 17 and through hole 12 are aligned. A coupling means 6 is then inserted through holes 17 and 12.

In practice, the components are assembled inside a container by an operator. With one hand, the operator must now orient the components in relation to each other and with the other hand insert the coupling means through the holes. This is difficult, because as soon as the rod rotates, the holes are no longer aligned, and assembly fails.

An object of the present invention is therefore to specify an improved cleaning device. A particular object of the present invention is to provide a cleaning device that overcomes at least one of the aforementioned disadvantages of the prior art. In particular, a cleaning device is to be specified which meets the requirements of the 3A standard and which allows simple construction and simple assembly.

The invention achieves the aforementioned object by means of a cleaning device according to claim 1.

In particular, the invention proposes a cleaning device of the kind initially specified, comprising: a base member that can be coupled to a feed pipe for supplying a cleaning agent, a rotating member mounted rotatably about a rotational axis on the base member, a support member having a first end portion and a second end portion spaced apart along the rotational axis (A), wherein the first end portion can be coupled to the base member and the second end portion to the rotating member in such a way that in the coupled state the rotating member is rotatably accommodated between the base member and the support member, wherein the cleaning device further comprises a coupling means which is adapted to lock the support member in place relative to the base member in the coupled state.

The invention is based on the realisation that coupling the components to each other, and fixing or locking the components in the coupled state, as well as securing the device by means of the coupling means against falling apart, are functionally separate from each other. The base member and the support member are thus already coupled to each other and receive the rotating member between them before the coupling means fixes or locks the support member in the coupled state relative to the base member. The cleaning device advantageously does without the use of screw connections and the like, so the requirements of the 3A standard are met.

The coupling means is preferably adapted to couple the base member in the coupled and locked state to the feed pipe for supplying cleaning agent. The base member and the support member are thus already coupled to each other and receive the rotating member between them before the coupling means fixes or locks the support member in the coupled state relative to the base member and couples the cleaning device to a feed pipe or a container. During assembly, therefore, in particular in a tank, only the components of the cleaning device are firstly coupled to each other, and the arrangement is subsequently attached to the cleaning agent inlet. This obviates the need, before attaching the cleaning device to the cleaning agent inlet, to check the arrangement of the support member relative to the base member and of the other components of the cleaning device, as these are already in the coupled state.

The coupling means is preferably form-fittingly and detachably engageable with the base member in order to lock the support member in place relative to the base member in the coupled state. A detachable, form-fitting connection can be easily cleaned, thus fulfilling the requirements of the 3A standard.

According to a preferred embodiment of the invention, the support member is insertable into the base member in such a way that it is rotatably accommodated in a first position in the base member and is moveable in the base member into a second position in which the support member engages form-fittingly with the base member in the coupled state. The base member and the support member are preassembled, therefore, and form a receptacle for the rotating member. This coupled state is reached independently of the coupling means.

The coupling means is preferably engageable with the base member in such a way that the coupling means prevents the support member from moving back into the first position from the second position. The coupling means locks or secures the support member and the base member in the coupled state, such that the base member and the support member are non-releasably coupled to each other as long as the coupling means is engaged with the base member.

According to another preferred embodiment of the invention, the base member has an end face facing the rotating member in the assembled state and having an aperture, preferably slot-like, by which the first end portion of support member is insertable into the base member, wherein the first end portion, when it has been inserted into the base member, is form-fittingly engageable with the base member by a rotational movement about its rotational axis.

The support member preferably has a rod that extends along the rotational axis A between the first end portion and the second end portion and in the coupled state is accommodated at least in sections thereof in the rotating member. The support member thus has a rod that forms a receptacle for the rotating member.

It is also preferred that the first end portion has at least one vane extending radially outwards from the rod and designed to match the aperture such that the vane can pass through the aperture and engages form-fittingly behind the aperture by a rotational movement about its rotational axis A. The support member can thus be brought into form-fitting engagement with the base member in a simple manner.

The rotating member is preferably rotationally symmetric in design and is arranged coaxially with the base member and/or the support member. The rotating member can thus be guided in its rotational movement on the base member and/or the support member.

According to another preferred embodiment, the cleaning device further comprises a bearing element, in particular a bearing ring, for mounting the rotating member on the support member. The rotating member is thus mounted securely on the support member, and the friction between the support member and the rotating member is reduced. Reduced friction results in a reduced rotational resistance and thus greater efficiency when driving the rotating member, in particular for distributing cleaning agent.

A slide surface is preferably formed on the base member, and the rotating member has a matching slide surface which cooperates with the slide surface of the base member. This reduces the friction between the base member and the rotating member. Reduced friction results in a reduced rotational resistance and thus greater efficiency when driving the rotating member, in particular for distributing cleaning agent.

It is also preferred that the bearing element and/or the slide surface is conical in shape in order to support the rotating member in the axial and in the radial direction. The rotating member is thus supported and guided in the radial direction and in the direction of rotational axis A by the bearing element and/or the slide surface.

The bearing element preferably includes a polymer, preferably polytetrafluoroethylene (PTFE). Polymers and polytetrafluoroethylene (PTFE) in particular have a low coefficient of friction and are therefore particularly suitable for forming bearing elements.

It is also preferred that the support member and/or the rotating member includes a metal material, preferably stainless steel. A metal material, such as stainless steel, has good chemical stability and is wear-resistant. Furthermore, the combination of a bearing ring containing a polymer, in particular polytetrafluoroethylene (PTFE), and a support member or rotating member made of steel prevents seizure of the components, for example, and reduces the "stick-slip effect". The stick-slip effect refers to the jerking motion of two solid bodies that are moved against each other.

The base member preferably has a cylindrical portion which is fluidically connectable, at least in sections, to a feed pipe for supplying cleaning agent. Such a cylindrical portion matches the mostly cylindrical shape of pipes, conduits and connecting elements and can thus be fluidically coupled in a simple manner to such pipes, conduits and connecting elements. For example, the cylindrical portion can simply be inserted into a feed pipe whose inner diameter is substantially the same as the outer diameter of the cylindrical portion.

The rotating member preferably has at least one spray hole through which the cleaning agent can be introduced into the container. Through an aperture on the rotating member, the cleaning agent is evenly distributed inside a container to be cleaned. The pressure inside the rotating member can be used to control the mechanical effect or "impact" of the discharged cleaning agent on the inner wall of the container to be cleaned.

It is also preferred that the base member further comprises, in the region of its cylindrical portion, a self-cleaning bore extending from the interior of the base member towards the rotating body and is adapted to conduct cleaning agent from the interior of the base member towards the outer side of the rotating member. In this way, dirt and residues of cleaning agent can be removed via such a bore to the outside of the rotating member.

Other advantageous embodiments of the cleaning device according to the invention are specified in the dependent claims.

The invention has been described above with regard to a first aspect.

In a second aspect, the invention also relates to a method for assembling a cleaning device, in particular for assembling a cleaning device of the kind described in the foregoing.

According to the second aspect, the invention achieves the object described above by the subject-matter of claim 18.

In particular, the invention proposes a method of assembling a cleaning device, in particular a method for assembling a cleaning device of the kind described in the foregoing, wherein the method comprises the steps of:

bringing the cleaning device into a coupled state, locking the cleaning device in the coupled state, coupling the cleaning device in the coupled and locked state to a feed pipe for supplying cleaning agent.

The method according to the invention and the possible developments thereof have features or steps that make them specifically suitable for use with a cleaning device according to the preceding aspect and with the various developments thereof.

For further advantages, variants of the invention and details of this other aspect and possible developments thereof, reference is made to the above description of the respective features and developments of the cleaning device.

The step of bringing the cleaning device into a coupled state comprises the steps of:

- coupling a support member of the cleaning device, in particular a first end portion of the support member to a base member, and
- coupling the support member, in particular a second end portion of the support member, to a rotating member so that in the coupled state the rotating member is rotatably accommodated between the base member and the support member.

It is also preferred that the step of locking the cleaning device in the coupled state comprises the step of locking the support member in place relative to the base member in the coupled state by means of a coupling means.

Other advantageous embodiments of the cleaning device according to the invention are specified in the dependent claims.

Figure 2:
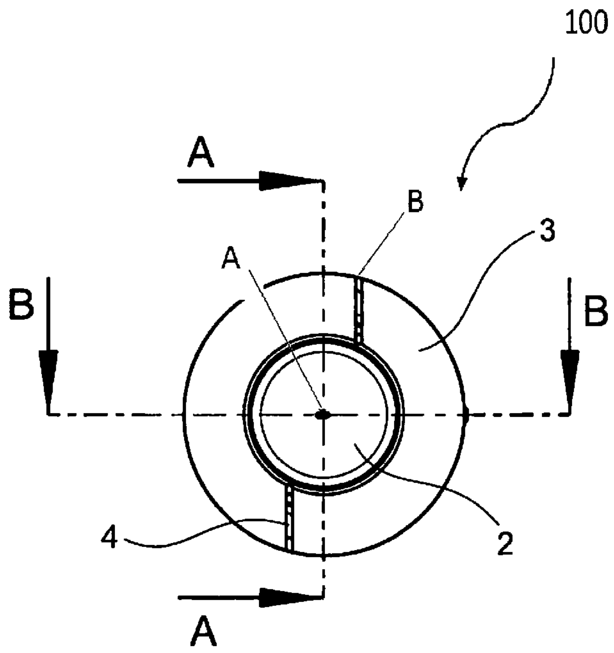
Figure 3A:
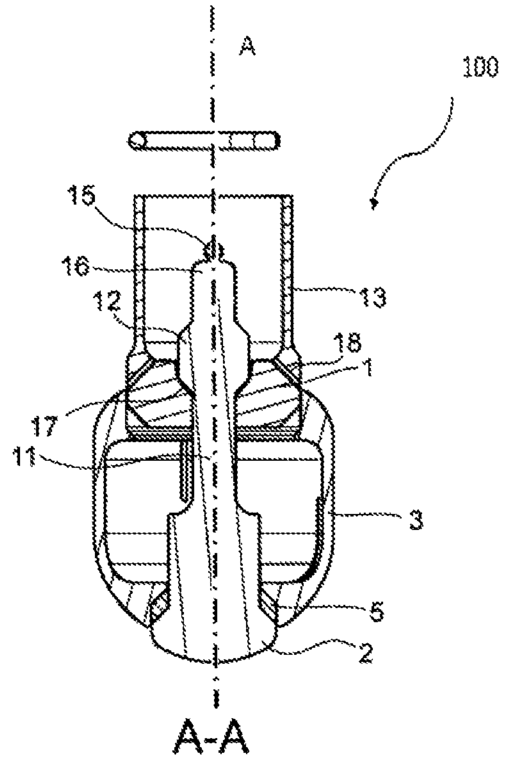
Figure 3B:
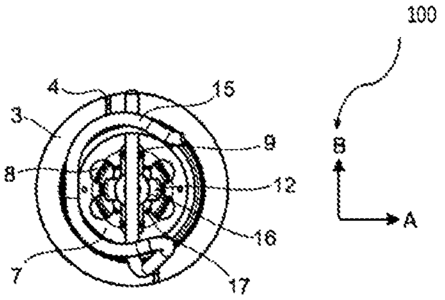
Figure 4:
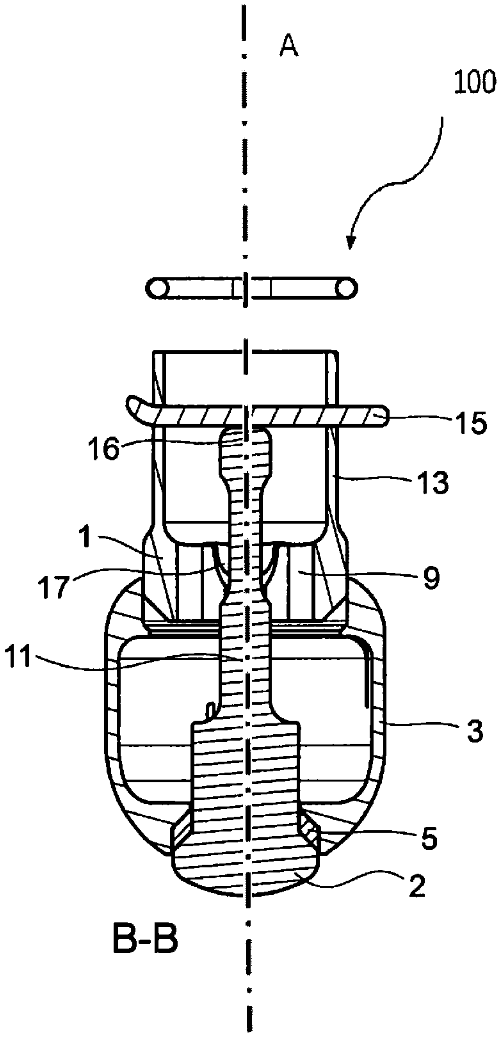

The invention shall now be described with reference to a preferred embodiment and the attached Figures, in which:

FIG. 1: shows an exploded perspective view of the cleaning device;

FIG. 2: shows a first top view of the rotating member of the cleaning device;

FIG. 3*a*: shows a sectional view of the cleaning device along line A-A,

FIG. 3*b*: shows a second top view of the cleaning device as a cross-sectional view;

FIG. 4: shows a cross-sectional view of the cleaning device along line B-B.

FIG. 1 shows an exploded view of a cleaning device 100 according to the invention.

Cleaning device 100 comprises a base member 1 that is connectable to a feed pipe. This connection is preferably releasable in design.

A support member 2 is releasably connected to base member 1. Base member 1 and support member 2 together form a receptacle for a rotating member 3, which is accommodated rotatably about a rotational axis A.

Rotating member 3 has spray holes 4 in the form of spraying slots 4, for example, and extending in the direction of rotational axis A. Spray holes 4 are shaped in such a way that rotating member 3 is made to rotate by fluid (cleaning fluid) being expelled, thus resulting in a spray pattern that meets the requirements. Even coverage is generally aimed for, whereby the fluid being expelled should also have a mechanical effect on dust and dirt.

Cleaning device 100 further comprises a bearing element 5 which is arranged between support member 2 and rotating member 3 and is adapted to rotatably mount rotating member 3 on support member 2.

Bearing element 5 may preferably be embodied as a bearing ring which is conically shaped in order to support rotating member 3 in the radial direction and in the direction of rotational axis A. Using a separate bearing element 5 allows a selection of different materials to be paired, for example polytetrafluoroethylene (PTFE) for bearing element 5 and stainless steel for support member 2. Such a pairing prevents seizure of the components, for example, and reduces the stick-slip effect.

To support the bearing of rotating member 3, an upper slide surface 6, which is conical in shape so as to support rotating member 3 simultaneously in the radial direction and in the direction of rotational axis A, is formed on base member 1.

The base member has an end face 7 that faces rotating member 2. This end face has at least one passage 8 through which liquid can flow out of base member 1 into the interior of rotating member 3.

A slot-like aperture 9 extending from end face 7 along rotational axis A into the interior of base member 1 is formed in end face 7. A central bore 10 is formed in end face 7 and hence also in slot 9.

Support member 2 has a rod 11 which extends along rotational axis A and which is dimensioned so that it extends through rotating member 3 and end face 7 in the coupled state of cleaning device 100.

Support member 2 also has a first end portion 16 which can be coupled to base member 1. Support member 2 also has a second end portion which can be coupled to rotating member 3.

End portion 16 disposed at the end of rod 11 has at least one vane 12 which is accommodated in base member 1 in the coupled state of cleaning device 100. Rod 11 is therefore dimensioned such that it can be guided through the central bore. Vane 12, for its part, is dimensioned such that it can be guided through slot 9.

The base member has a hollow cylindrical portion 13. Cylindrical portion 13 can be accommodated, for example, in a feed pipe through which cleaning fluid flows. Cylindrical portion 13 may also be designed in such a way that the feed pipe is accommodated in portion 13. A hole 14 is form in cylindrical portion 13.

Cleaning device 100 is brought into the coupled state by inserting rod 11 and vane 12 of support member 2 into base member 1 through apertures 9, 10 and by vane 12 being brought by rotation into form-fitting engagement with base member 1, out of which support member 2 cannot be moved by the force of gravity alone.

Cleaning device 100 further comprises a coupling means 15 for attaching cylindrical portion 13 to the feed pipe. In the coupled state of cleaning device 100 at least, coupling means 15 can be inserted into hole 14 in order to engage form-fittingly with base member 1 and lock support member 2 and base member 1 in the coupled state.

For example, cleaning device 100 in the coupled state can be guided single-handedly through a tank opening to a feed pipe inside the tank and attached to the end thereof. The coupling means is finally inserted through hole 14 and guided over the first end portion 16. This secures or locks the spatial arrangement of the parts, in particular of base member 1 and support member 2. It is also possible at the same time and by means of the coupling means to attach cleaning device 100 to the feed pipe.

FIG. 2 shows a view onto cleaning device 100 from the side facing away from base member 1. Spray hole 4 of rotating member 3 is embodied as an elongate spraying slot 4, whereby spraying slot 4 extends along an extension axis B that is not oriented in the direction of rotational axis A and does not intersect it.

The quantity, size and orientation of the apertures 4 formed as spraying slots in the example determine the rigidity of rotating member 3 and the formation of the expelled spray jet, and hence the spray pattern produced by cleaning device 100.

FIG. 3 *a*) shows a cross-sectional view, along line A-A, through cleaning device 100 in the coupled state.

Vane 12 on rod 11 of support member 2 rests in a recess 17 which is formed on end face 7 facing hole 14. The dimensioning of rod 11 in the direction of rotational axis A is such that the first end portion 16 projects towards coupling means 15.

Vane 12, recess 17, the distance of hole 14 to end face 7, and the length of rod 11 are dimensioned such that rod 11 and hence support member 2 can move with only a small amount of play. Vane 12 and recess 17 are also designed in such a way that rotation of support member 2 about rotational axis A is not possible, or possible to a small extent only when base member 1, support member 2, rotating member 3 and coupling means 15 are in the assembled state. In particular, no rotation is possible by which vane 12 can align with slot 9, which would lead to cleaning device 100 falling apart.

The number of vanes 12, and their distribution along a periphery of rod 11, is preferably selected such that force is applied evenly from rod 11 into end face 7.

A self-cleaning bore 18 leading from an interior of cylindrical portion 13 towards rotating member 3 is also provided. Cleaning fluid passes through this self-cleaning bore 18 and then flows off an outer side of rotating member 3.

FIG. 3 *b*) shows cleaning device 100 in the coupled state. The first end portion 16 can be seen at the centre. In the example, it is surrounded by four openings 8 that are evenly distributed in the circumferential direction and in particular in the form of an ring. The ring of openings 8 is interrupted in sections by slot 9 extending in the radial direction.

In the coupled state, vane 12 is transverse to slot 9 and rests in the elliptically shaped recess 17. A short axis of the elliptically shaped recess 17 extends parallel to slot 9, and a long axis extends perpendicular to slot 9. The short axis of the elliptically shaped recess 17 is shorter than the radial extension of vane 12. In order fora rotation to align vane 12 with slot 9, it is necessary to lift vane 12 out of the plane of the drawing. However, this is blocked by coupling means 15.

FIG. 4 shows the longitudinal cross-section through cleaning device 100 along line B-B, which runs through the plane of slot 9. It can be seen that recess 17 forms a pocket which penetrates end face 7 only partially, in this case half way.

LIST OF REFERENCE SIGNS

A Rotational axis
B Extension axis
1 Base member
2 Support member
3 Rotating member
4 Spray hole
5 Bearing element
6 Slide surface
7 End face
8 Passage
9 Aperture, central bore
10 Aperture, central bore
11 Rod
12 Vane
13 Cylindrical portion
14 Hole
15 Coupling means
16 First end portion
17 Recess
18 Self-cleaning bore
100 Cleaning device

The invention claimed is:

1. A cleaning device for cleaning a container, in particular an inner wall of a container, comprising:

a base member that can be coupled to a feed pipe for supplying a cleaning agent, a rotating member mounted rotatably about a rotational axis on the base member, a support member having a first end portion and a second end portion spaced apart along the rotational axis, wherein the first end portion can be coupled to the base member and the second end portion to the rotating member in such a way that in the coupled state the rotating member is rotatably accommodated between the base member and the support member, wherein the cleaning device further comprises a coupling means which is adapted to lock the support member in place relative to the base member in the coupled state, and wherein the support member is insertable into the base member in such a way that it is rotatably accommodated in a first position in the base member and is moveable in the base member into a second position in which the support member engages form-fittingly with the base member in the coupled state.

2. The cleaning device according to claim 1, wherein the coupling means is adapted to couple the base member in the coupled and locked state to the feed pipe for supplying a cleaning agent.

3. The cleaning device according to claim 1, wherein the coupling means is form-fittingly and detachably engageable with the base member in order to lock the support member in place relative to the base member in the coupled state.

4. The cleaning device according to claim 1, wherein the coupling means is engageable with the base member in such a way that the coupling means prevents the support member from moving back into the first position from the second position.

5. The cleaning device according to claim 1, wherein the base member has an end face facing the rotating member in the assembled state and having an aperture by which the first end portion of support member is insertable into the base member, wherein the first end portion, when it has been inserted into the base member, is form-fittingly engageable with the base member by a rotational movement about its rotational axis.

6. The cleaning device according to claim 5, wherein the support member has a rod that extends along the rotational axis between the first end portion and the second end portion and in the coupled state is accommodated at least in sections thereof in the rotating member.

7. The cleaning device according to claim 6, wherein the first end portion has at least one vane extending radially outwards from the rod and designed to match the aperture such that the vane can pass through the aperture and engages form-fittingly behind the aperture by a rotational movement about its rotational axis.

8. The cleaning device according to claim 1, wherein the rotating member is rotationally symmetric in design and is arranged coaxially with the base member and/or the support member.

9. The cleaning device according to claim 8, further comprising a bearing element, in particular a bearing ring, for mounting the rotating member on the support member.

10. The cleaning device according to claim 8, wherein a slide surface is formed on the base member, and the rotating member has a matching slide surface which cooperates with the slide surface of the base member.

11. The cleaning device according to claim 9, wherein the bearing element is conical in shape in order to support the rotating member in the axial and in the radial direction.

12. The cleaning device according to claim 9, wherein the bearing element includes a polymer.

13. The cleaning device according to claim 1, wherein the support member includes a metal material.

14. The cleaning device according to claim 1, wherein the base member has a cylindrical, in particular a hollow cylindrical portion which is fluidically connectable, at least in sections, to a feed pipe for supplying a cleaning agent.

15. The cleaning device according to claim 1, wherein the rotating member has at least one spray hole through which the cleaning agent can be introduced into the container.

16. The cleaning device according to claim 14, wherein the base member further comprises, in the region of its cylindrical portion, a self-cleaning bore extending from the interior of the base member towards the rotating body and is adapted to conduct cleaning agent from the interior of the base member towards the outer side of the rotating member.

17. A method for assembling a cleaning device, said method comprising the steps of:

providing a cleaning device for cleaning a container, said cleaning device including a base member that can be coupled to a feed pipe for supplying a cleaning agent, a rotating member that can be mounted rotatably about a rotational axis on the base member, a support member having a first end portion and a second end portion spaced apart along the rotational axis, wherein the first end portion can be coupled to the base member and the second end portion to the rotating member in such a way that in the coupled state the rotating member is rotatably accommodated between the base member and the support member, wherein the cleaning device further comprises a coupling means which is adapted to lock the support member in place relative to the base member in the coupled state, wherein the support member is insertable into the base member in such a way that it is rotatably accommodated in a first position in the base member and is moveable in the base member into a second position in which the support member engages form-fittingly with the base member in the coupled state;

bringing the cleaning device into a coupled state, locking the cleaning device in the coupled state, coupling the cleaning device in the coupled and locked state to a feed pipe for supplying a cleaning agent.

18. The method according to claim 17, wherein the step of bringing the cleaning device into a coupled state comprises the steps of:

coupling the support member of the cleaning device, in particular the first end portion of the support member to the base member, and coupling the support member, in particular the second end portion of the support member, to the rotating member so that in the coupled state the rotating member is rotatably accommodated between the base member and the support member.

19. The method of claim 17, wherein the step of locking the cleaning device in the coupled state comprises the step of locking the support member in place relative to the base member in the coupled state by means of the coupling means.

20. The cleaning device according to claim 10, wherein the slide surface is conical in shape in order to support the rotating member in the axial and in the radial direction.

* * * * *